US005539607A

United States Patent [19]

Komatsu et al.

[11] Patent Number: 5,539,607

[45] Date of Patent: Jul. 23, 1996

[54] TANK-SHAPE ARRESTER

[75] Inventors: Katsuaki Komatsu; Yoshihide Kayano; Masahiro Kan, all of Yokohama, Japan

[73] Assignee: Kabushiki Kaisha Toshiba, Kawasaki, Japan

[21] Appl. No.: 262,330

[22] Filed: Jun. 17, 1994

[30] Foreign Application Priority Data

Jun. 18, 1993 [JP] Japan .................................... 5-146642

[51] Int. Cl.[6] ........................................................ H02H 3/00

[52] U.S. Cl. .......................... 361/126; 361/111; 361/117; 361/120

[58] Field of Search ................................ 361/56, 91, 127, 361/120, 126, 111, 117; 200/148; 338/21

[56] References Cited

U.S. PATENT DOCUMENTS 4,321,651 3/1982 Ozawa et al. ........................... 361/127
4,413,165 11/1983 Schultz .................................... 200/148

FOREIGN PATENT DOCUMENTS 54-8854 1/1979 Japan ............................... H01T 5/00
641913 1/1989 Japan ............................... H01T 1/00

*Primary Examiner*—Jeffrey A. Gaffin
*Assistant Examiner*—Stephen Jackson
*Attorney, Agent, or Firm*—Oblon, Spivak, McClelland, Maier & Neustadt

[57] ABSTRACT

An arrester in the shape of a tank has a cylindrical grounding tank as an outer casing to be arranged vertically in which an insulating medium is enclosed. In the grounding tank, a non-linear element group is disposed, the non-linear element group is formed by vertically stacking a plurality of non-linear resisting elements in series at a substantially axially central portion of the grounding tank. A shield having an umbrella-like shape is disposed on a high potential side of the non-linear element group. A shielding unit is operatively connected to a low potential side of the umbrella-shaped shield through a support member. The shielding unit comprises at least one shielding member having a spherical shape provided with a spherical surface portion facing an inner side wall of the grounding tank. When two shielding members are disposed, they are positioned axially symmetrically with respect to the non-linear element group, which comprises a single column or a plurality of symmetrically arranged columns of non-linear resisting element stacks standing upwards along the central axis of the grounding tank.

13 Claims, 5 Drawing Sheets

TANK-SHAPE ARRESTER

BACKGROUND OF THE INVENTION

1. Field of The Invention

The present invention relates to an arrester in shape of a tank having a non-linear resistor the main component of which is a zinc oxide element.

2. Related Prior Art

An arrester, or lighting arrester, using a zinc oxide element has excellent characteristics, such as current-voltage linearity, discharge withstand current rating characteristics and chemical stability, and thus, it has been widely used in place of a conventional arrester utilizing series gaps and a silicon carbide non-linear resistor. In recent years, an arrester having further protective characteristics for use in a high potential system, such as 275 kV or 500 kV, has been developed and employed.

An arrester of the type described above is in a trend that the average stress (charging rate) in a system voltage always applied is raised for use. In order to ensure and maintain reliability for a long time, development of technology for uniformly assigning voltage for the purpose of uniforming assigning voltage for each zinc oxide element becomes significantly important.

A conventional tank-shape arrester will be first described with reference to FIGS. 7 and 8.

A non-linear element group 1 formed by stacking zinc oxide elements in series is accommodated in a cylindrical grounding tank 3 which is placed in a vertical attitude and in which an insulating medium 2, such as $SF_6$ gas, exhibiting excellent insulating characteristics is enclosed, the non-linear element group 1 being disposed coaxially with the grounding tank 3. An axial end, i.e. the top end in the illustration, of the non-linear element group 1 is connected to a bus-line from a transforming station side through a high-potential conductor 5 supported by an insulating spacer 4. In the tank-shape arrester, a shield 6 having an umbrella-like shape is further disposed in the high potential side of the non-linear element group 1 and a ground potential portion is connected to the low potential side of the non-linear element group 1. Two or more annular ring-shaped shields 8 are disposed on the low potential side of the umbrella-shaped shield 6 through a plurality of, for example, four, connection support members 7 each having a narrow width in the circumferential direction so that voltage assignment to the zinc oxide elements in the non-linear element group 1 is uniformed.

Another example of a conventional tank-shape arrester is shown in FIG. 8, in which a circular arc-shaped shield 9 is, in place of the annular shield, connected to the shield 6 through a connection support member 7.

Although the tank-shape arresters of the types arranged as shown in FIGS. 7 and 8 are able to uniform the voltage assignment with a satisfactory accuracy for practical use to 500 kV class, a problem arises in that a required accuracy cannot be obtained to 1000 kV class which has been researched and developed at present time.

The reason for causing such problem will be described hereunder with reference to FIGS. 5A, 5B and 6. FIGS. 5A and 5B are views for the explaining the control of the potential distribution. Like reference numerals are added to elements or members corresponding to those shown in FIG. 8 and their descriptions are omitted.

In order to completely uniform the potential in the non-linear element 1, an electric current, which leaks to the grounding tank 3 serving as a grounding potential and which is the same as the charging current, is required to flow from the shield on the high potential side. Therefore, the following Equations (1) and (2) are held initially.

$$C(x)\cdot dx[1-V(x)]=Cs(x)\cdot dx\cdot V(x) \quad (1)$$

$$V(x)=1-x \quad (2)$$

where C(x) is a capacitance between the high potential shield and the zinc oxide element at position x and Cs(x) is a capacitance between the zinc oxide element and the ground potential at position x. By arranging Equations (1) and (2), the following Equation (3) can be obtained.

$$C(x)/Cs(x)=1/(x-1) \quad (3)$$

FIG. 6 is a graph expressing Equation (3). Namely, it is a graph showing capacitance distribution in an ideal state. That is, by realizing the shield shape satisfying the capacitance distribution as represented in Equation (3) and FIGS. 5A and 5B, a uniform voltage assignment in the axial direction of the non-linear element group 1 can be obtained even if the zinc oxide element has no capacitance.

However, it is difficult in actuality to completely realize the shield shape satisfying such characteristics as shown in FIG. 6. Therefore, a variety of approximated shapes have been suggested as exemplified by those shown in FIGS. 7 and 8. The zinc oxide element is provided with a function to serve as a dielectric substance having a relatively large dielectric constant in a state where the system voltage is always applied. Therefore, the effect of the self-electrostatic capacity of the zinc oxide element enables an approximated shield shape to restrict the voltage assignment to a satisfactory practical level depending upon the class of voltage (500 kV class).

Since the tank-shape arrester shown in FIG. 7 uses the annular shield 8, the capacitance C(x) between the non-linear element group 1 and the grounding tank 3 facing each other through the annular shield 8 is shielded to be approximately zero. Therefore, the value of C(x)/Cs(x) becomes excessively apart from the ideal state shown in FIG. 6. As a result, the potential distribution of the non-linear element group 1 is disordered. Therefore, the number of pieces disposed in series in the non-linear element group 1 increases as compared with the 500 kV class. As a result, the dispersion of the voltage assignment cannot be controlled to a satisfactory range for practical use if the shield shape as shown in FIG. 7 is employed in the 1000 kV class having a smaller self-electrostatic capacitance, thus being inconvenient.

In order to obviate such problem or defect, the prior art further provides an arrester having a rod-like or plate-like shield projecting diagonally. However, the arrester of this type involves a too complicated shield structure, and analysis thereof is hence made difficult. Therefore, an actual measurement is required whenever the structure of the non-linear element group 1 is changed. Thus, such an arrester cannot be used easily. Accordingly, a tank-shape arrester having a simplified shield structure as shown in FIG. 8 has been suggested.

It might be considered to employ a structure for the arrester to be adapted to a high potential system of 1000 kV class, the structure in which a plurality of, for example, four, parallel zinc oxide element groups in shape of columns are connected in parallel to serve as a non-linear element group because of the following two main reasons.

(1) In order to reduce the size of an equipment and a power transmission line, a very low limit voltage (a protection level) is set to the arrester, and in order to realize the low limit voltage, it is necessary to connect the zinc oxide element groups (columns) in parallel and to reduce a surge electric current flowing through each zinc oxide element column to lower the limit voltage.

(2) Since the diameter of the conductor in the power transmission line is enlarged and the number of the conductors is increased, the surge impedance is lowered and thus the load required for performing opening/closing operation becomes heavier. In addition, severer resistance against an excess voltage for a short time due to interruption of a load is required. Thus, a required energy resistance quantity becomes severer and, therefore, it becomes necessary to increase an energy resisting quantity by connecting the zinc oxide element columns.

It is important for the arrester of 1000 kV class to uniform the divided current flowing through each parallel column to a satisfactory level. In particular, the zinc oxide element may cause an imbalance of the divided flow if the current-voltage characteristics of each parallel column are not arranged accurately because the zinc oxide element has an excellent non-linearity. For example, the imbalance of the divided flow cannot be restricted to be within ±10% if the dispersion of the limit voltage for each parallel column is not controlled to be within ±0.2% as shown in the following Equation (4).

$$I_{max}/(I_{total}/4) = \{4\times(1.002)^{30}\}/\{(1.002)^{30}+3\times(1.002)^{30}\} = 1.093 \quad (4)$$

Since the dispersion of the limit voltage for each zinc oxide element involves about ±10% in usual, for example, five, elements are combined as one block to control the dispersion to be about ±0.2%. The thus combined blocks are stacked so as to correspond to the rated voltage. The dispersion of the limit voltage is decreased in proportion to $1/n^{1/2}$ (n: integer) in an assumption of a normal distribution if the number of the zinc oxide elements in series is n. Therefore, since the arrester of the 1000 kV class comprising about 300 zinc oxide elements disposed in series provides a dispersion of about ±0.26% even if the elements are stacked randomly as expressed by the following Equation (5), it can be controlled practically.

$$2\%(\sqrt{300/5})=0.26\% \quad (5)$$

However, the asymmetrical arrangement of the shield of the arrester shown in FIG. 8 provides an imbalance of the potential distribution for each parallel column of the non-linear element group 1. Therefore, it is difficult to control the potential distribution of all parallel columns to be uniform. In order to overcome this problem, it is necessary to divide each parallel column into a plurality of blocks having an adequate number of elements and to mutually connect the parallel columns in each block. In this case, it is difficult to easily and precisely control the combination of the blocks, resulting in the causing of the imbalance of the divided flow, thus being disadvantageous in the discharge resistance.

The prior art further provides a structure in which a plurality of circular arc-shaped shields are disposed symmetrically with respect to a non-linear element group composed of a plurality of parallel columns. However, since a circular-directional free end of the circular arc shield becomes an excessively high electric field, the electric field must be relaxed by causing the circular-directional free end of the circular arc shield to have an adequate spherical surface. Therefore, it is difficult to manufacture an arrestor of such structure.

As described above, the conventional tank-shape arrester encounters a difficulty in uniforming the voltage assignment in the non-linear element group. In particular, if the arrester has a large capacity and uses a non-linear element group composed of a plurality of parallel columns, the imbalance in the divided current flow between columns cannot be easily prevented, thus being inconvenient.

SUMMARY OF THE INVENTION

An object of the present invention is to substantially eliminate defects or drawbacks encountered in the prior art described above and to provide an arrester in the shape of tank which is capable of easily making uniform voltage assignment of a non-linear element group and also capable of reducing an imbalance in divided current flow between a plurality of parallel columns constituting the non-linear element group.

This and other objects can be achieved according to the present invention by providing an arrester in the shape of tank which comprises:

a cylindrical grounding tank to be arranged vertically in which an insulating medium is enclosed;

a non-linear element group disposed inside the grounding tank, the non-linear element group being formed by vertically stacking a plurality of non-linear resisting elements in series at a substantially axially central portion of the grounding tank;

a shield having an umbrella-like shape disposed on a high potential side of the non-linear element group;

a ground potential portion connected to a low potential side thereof; and a shielding means operatively connected to a low potential side of the umbrella-shaped shield through a support means, wherein the shielding means comprises at least one shielding member having a spherical shape provided with a spherical surface portion facing an inner side wall of the grounding tank and that said non-linear element group comprises at least one stack of the non-linear resisting elements.

In preferred embodiments, the shielding means includes two shielding members disposed axially symmetrically with respect to the non-linear element group. The non-linear element group may comprise a single column of non-linear resisting element stack standing upwards along the central axis of the grounding tank. The non-linear element group comprises a plurality of parallel columns arranged symmetrically with respect to a central axis of the grounding tank.

In the thus arranged tank-shape arrester according to the present invention, the spherical-shaped shield disposed around the non-linear element group does not completely shield the capacitance between the non-linear element group and the grounding tank, and a capacitance is generated between a position near the spherical shield of the non-linear element group and the grounding tank. Therefore, the capacitance between the low potential side of the non-linear element group and the spherical shield is reduced, while the capacitance between the non-linear element group and the grounding tank is enlarged. As a result, the capacitance distribution in the non-linear element group becomes near an ideal state, thus uniforming the voltage assignment in the non-linear element group in the axial direction of the cylindrical grounding tank.

In addition, even if the non-linear element group is formed with a plurality of parallel columns, the symmetrical arrangement of the spherical-crown shield makes it possible to control the potential distribution in each column so that it becomes uniformed. Therefore, it is not necessary, for realizing a desired potential distribution, to divide each parallel column into a plurality of blocks and to mutually connect the parallel columns in each block, thus facilitating the control of the divided current flow and preventing the imbalance in the divided current flow.

The nature and further features of the present invention will be made more clear from the following descriptions made with reference to the accompanying drawings.

DESCRIPTION OF THE PREFERRED EMBODIMENTS

Figure 1:
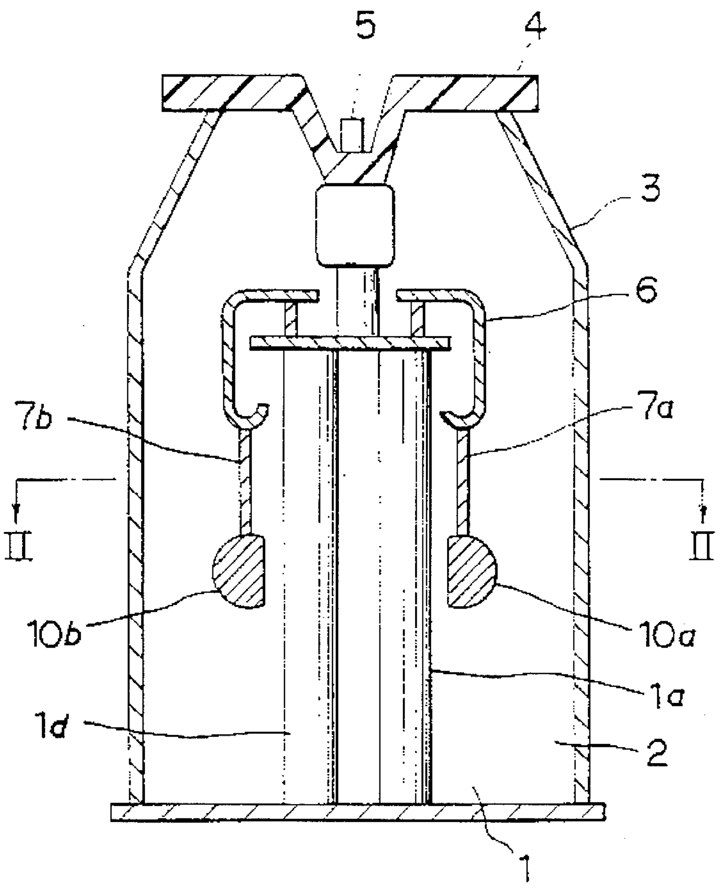
FIG. 1 is a vertical sectional view of a tank-shape arrester according to one embodiment of the present invention.

A first embodiment in which the tank-shape arrester according to the present invention is adapted to a tank-shape arrester for 1000 kV class high voltage system having a four-parallel column structure will be described hereunder with reference to FIGS. 1 and 2. The like reference numerals are added to members or elements corresponding to those shown in FIGS. 7 and 8 and their detailed description are therefore omitted herein.

Figure 2:
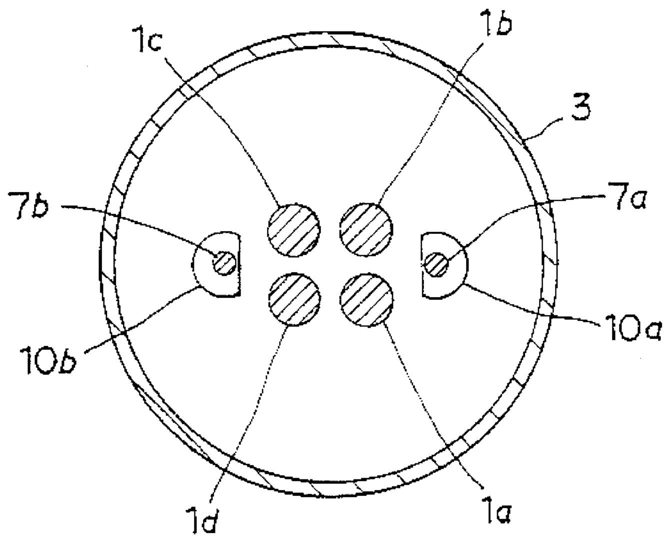
FIG. 2 is a cross sectional view taken along line II—II of FIG. 1.

Referring to FIGS. 1 and 2, a non-linear element group 1 comprising four columns 1*a* to 1*d*, arranged vertically in parallel and formed by stacking a plurality of zinc oxide elements as non-linear resistors in series, is accommodated in a cylindrical grounding tank 3 which is arranged vertically in use and in which an insulating medium 2 exhibiting excellent insulating characteristics such as $SF_6$ gas is enclosed. The four parallel columns 1*a* to 1*d* forming the non-linear element group 1 are, as shown in FIG. 2, disposed around the central axis of the grounding tank 3 so as to extend in the same axial direction as that of the cylindrical grounding tank 3. An axial end, the top end as viewed, of the non-linear element group 1 is connected to a bus line of a transforming station, not shown, through a conductor 5 on the high potential side supported by an insulating spacer 4. The low potential side of the non-linear element group 1 is connected to a ground potential portion. A shield 6 in the shape of an umbrella, for example, is disposed on the high potential side of the non-linear element group 1. Connection support members 7*a* and 7*b* are disposed on the low potential side of the umbrella-shaped shield 6. The connection support members 7*a* and 7*b* are formed with, for example, rod-shape conductors or lead lines. The number of them may be selectively determined as occasion demands. It is preferred that the connection support members 7*a* and 7*b* are disposed at symmetrical positions with respect to the central axis of the cylindrical grounding tank 3. Two metal shields 10*a* and 10*b* each in the shape of a spherical-crown are connected, by welding means, for example, to the low potential side of the shield 6 through the connection support members 7*a* and 7*b*. Each of the spherical-crown shields 10*a* and 10*b* are formed into a cup-like shape having a flat portion and spherical surface portion. In a set arrangement, the flat portion of the spherical-crown shield 10*a* faces two adjacent parallel columns 1*a* and 1*b*, the flat portion of the other spherical-crown shield 10*b* faces the other two adjacent parallel columns 1*c* and 1*d*, and the spherical surface portions of the spherical-crown shields 10*a* and 10*b* face the inner cylindrical wall surface of the grounding tank 3.

The function of the first embodiment of the arrester of the structure described above will be described hereunder.

Figure 5A:
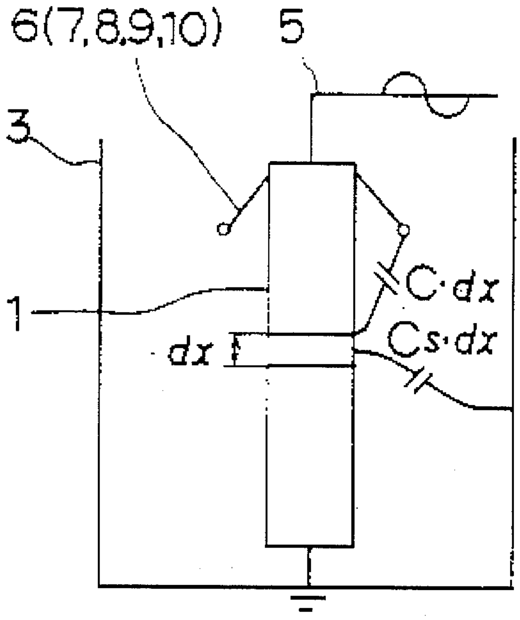
FIGS. 5A and 5B are views for the explaining principle of control of potential distribution.
Figure 5B:
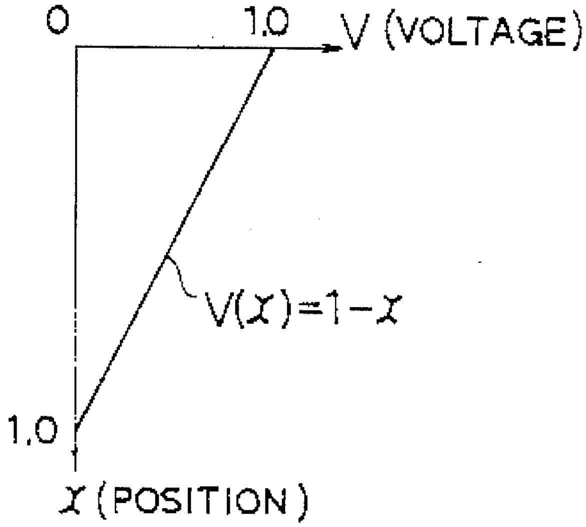
Figure 6:
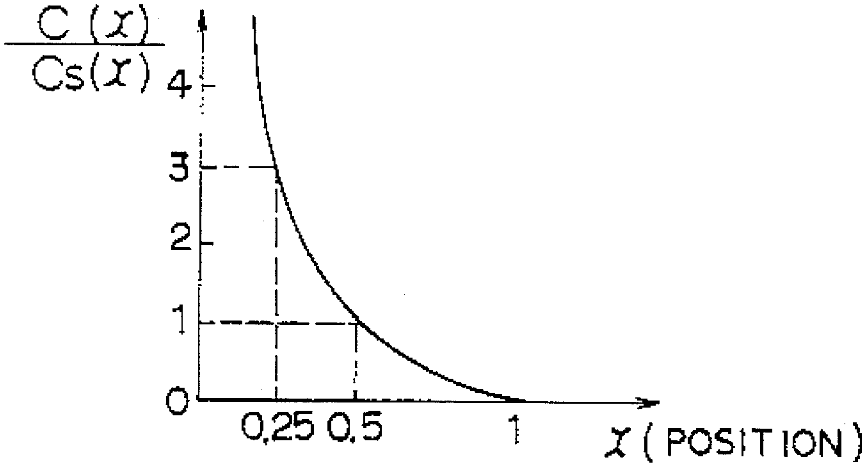
FIG. 6 is a graph showing an ideal capacitance distribution.
Figure 7:
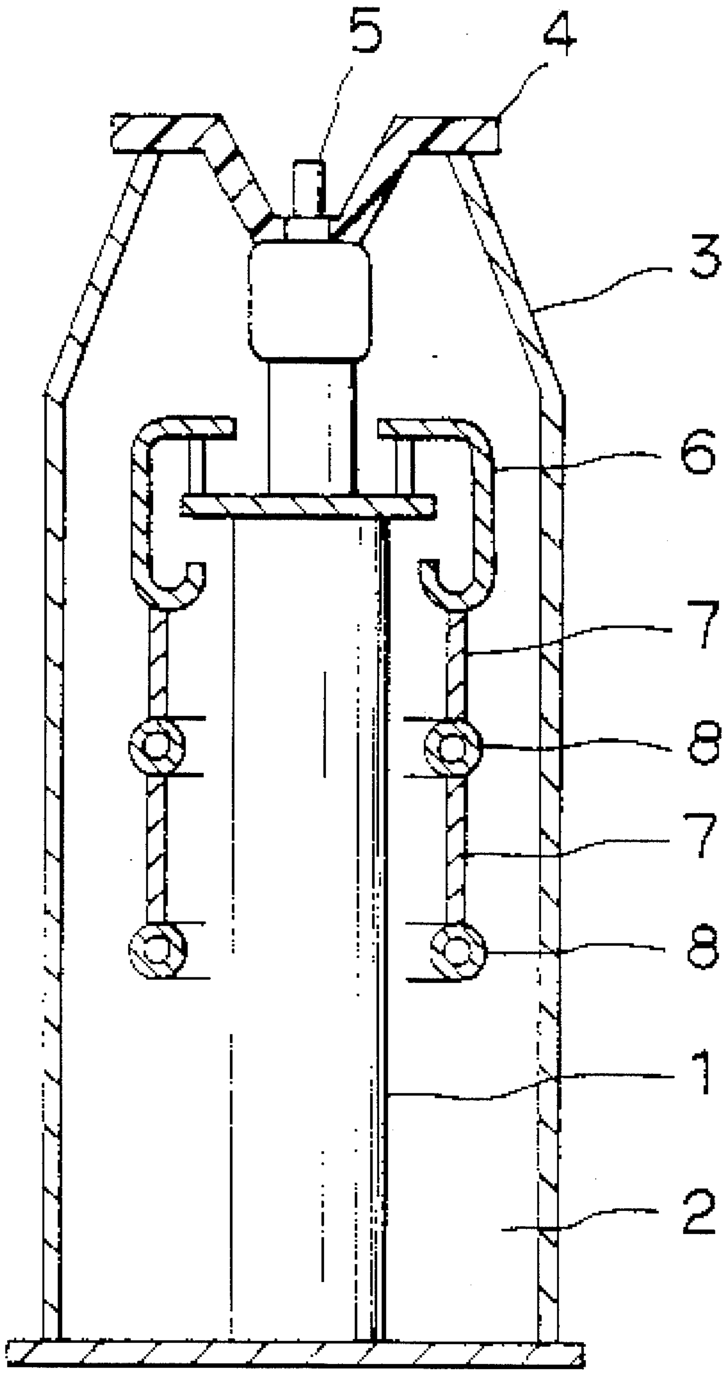
FIG. 7 PRIOR ART
FIG. 7 is a vertical sectional view of an example of a conventional tank-shape arrester.
Figure 8:
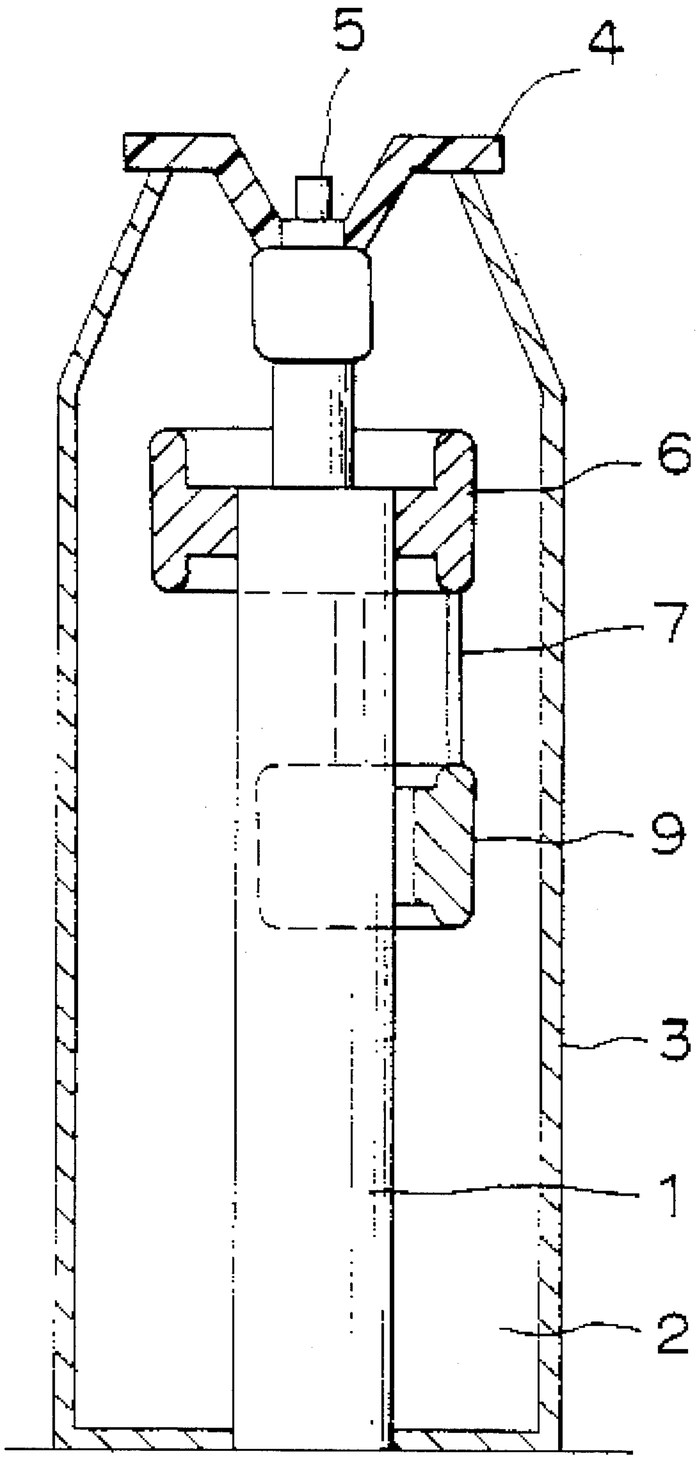
FIG. 8 PRIOR ART
FIG. 8 is also a vertical sectional view of another example of a conventional tank-shape arrester.

Since the spherical-crown shields 10*a* and 10*b* are disposed on the low potential side of the umbrella-shaped shield 6 through the connection support members 7*a* and 7*b*, capacitance Cs(x) is generated between the non-linear element group 1 adjacent to the positions of the spherical-crown shields 10*a* and 10*b* and the grounding tank 3. The connection support members 7*a* and 7*b* connect the spherical-crown shields 10*a* and 10*b* at substantially the same potential as that of the conductor 5 on the high potential side and sufficiently mechanically support and fix the spherical-crown shields 10*a* and 10*b*. Since the spherical-crown shields 10*a* and 10*b* are disposed apart from each other for a predetermined distance, a portion is formed in which the non-linear element group 1 and the grounding tank 3 face each other without interposing any shield in a manner different from a case in which an annular ring-shaped shield, such as shown in FIG. 7, is used. Therefore, capacitance Cs(x) is generated between the non-linear element group 1 and the grounding tank 3 and the capacitance between a lower potential side of the non-linear element group 1 on the low potential side and the spherical-crown shields 10*a* and 10*b* is reduced. Since the capacitance between the non-linear element group 1 and the grounding tank 3 is enlarged, the capacitance distribution in the non-linear element group 1 approaches the ideal state as shown in FIG. 5. As a result, the voltage assignment in the non-linear element group 1 can be made uniform effectively in the axial direction.

Further, since the spherical-crown shields 10*a* and 10*b* are symmetrically disposed around the non-linear element group 1, the potential distribution for each of the parallel columns 1*a* to 1*d* can be controlled uniformly. Therefore, it is not necessary to mutually connect the parallel columns in each block as made in the conventional arrangement. Accordingly, the dispersion of the limit voltage among the parallel columns 1*a* to 1*d* can be minimized, thus attributing to the reduction of the imbalance in the divided flow and improving the performance for processing energy. Furthermore, since the symmetrical arrangement of the connection support members 7*a* and 7*b* can make uniform the potential distribution among the parallel columns 1*a* to 1*d*.

Still furthermore, since the spherical surface portion of the spherical-crown shield faces the grounding tank and the flat portion of the spherical-crown shield faces the non-linear element group, the electric field of the spherical-crown shield can be relaxed. The spherical-crown shield is composed of only the spherical surface portion and flat portion, so that the arrester according to the present invention can be easily manufactured.

As described above, according to the tank-shape arrester of the first embodiment, the spherical-crown shields 10*a* and 10*b* are disposed on the low potential side of the shield 6 in the shape of an umbrella through the connection support members 7*a* and 7*b*. Therefore, the voltage assignment for the non-linear element group 1 of the high voltage class can be uniformed with satisfactory accuracy in use with a relatively simple structure. As a result, the reliability to serve as an arrester can be improved significantly. Since the connection support members 7*a* and 7*b* are arranged symmetrically as well as symmetrically disposing the spherical-crown shields 10*a* and 10*b*, the potential distribution in each of the parallel columns 1*a* to 1*d* can be controlled uniformly. Thus, the imbalance in the divided current flow among these columns can be prevented and the performance for processing energy can be improved. The spherical surface portion of the spherical-crown shield faces the grounding tank, so that the electric field can be relaxed. In addition, the structure of the spherical-crown shield comprising only the spherical surface portion and the flat portion facilitates the manufacturing of the arrester. Furthermore, since the arrester has a relatively simple structure, model formation, such as for the three-dimensional analysis of the electric field, can easily be performed. If a comparison is once made between the analysis and the results of measurement to establish a preferred mode, it becomes possible to relatively easily cope with changes in the size of the non-linear element group, the number of parallel elements and the electrostatic capacity, thus being advantageous and effective.

In a preferred embodiment, the shield 10*a* (10*b*) may be formed of a light metal such as aluminium or a plastic material an outer surface of which is metal plated. The spherical shape is desired to be a hemispherical shape having a spherical surface facing the inner side wall of the cylindrical grounding tank 3 and a flat surface facing the non-linear element group 1. Of course, it may be possible for the shield 10*a* (10*b*) to have a shape near spherical such as elliptical shape in section. Furthermore, in a practical use, the shield 10*a* (10*b*) may be positioned at a vertical level of ½ to ⅓ length of the longitudinal length of the non-linear element group from the bottom thereof.

The present invention is not limited to the embodiment of the described structure and other structures may be adapted. For example, in the first embodiment, the non-linear element group 1 is composed of four parallel columns 1*a* to 1*d* formed by stacking a plurality of zinc oxide elements as non-linear resistors in series, but, in an alternation, the non-linear element group 1 may be composed of a single column formed by stacking a plurality of non-linear resistors in series. Such alternation in which the non-linear element group 1 is formed with a single column will be described hereunder as another and further embodiments with reference to FIGS. 3 and 4, in which like reference numerals are added to members or elements corresponding to those in the first embodiment and their detailed description is therefore omitted herein.

Figure 3:
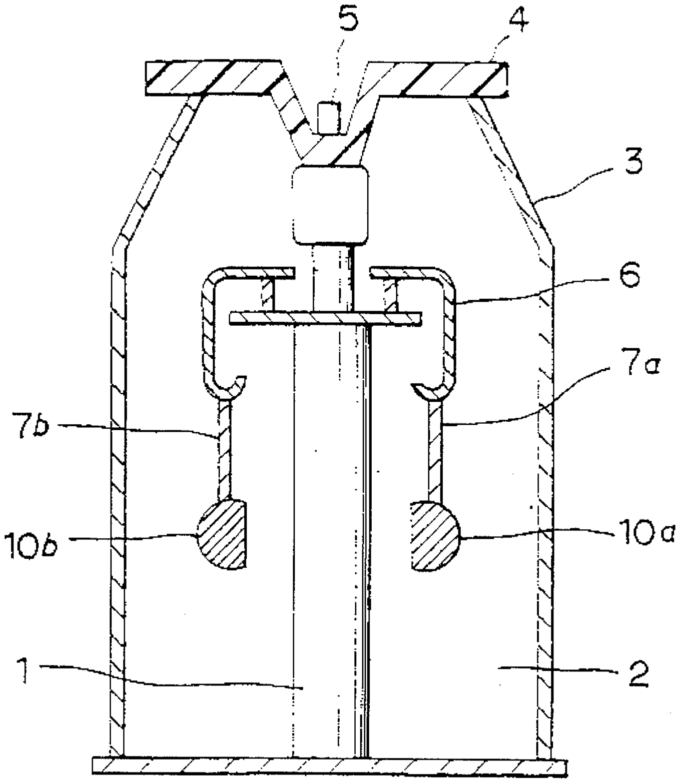
FIG. 3 is a vertical sectional view of a tank-shape arrester according to another embodiment of the present invention.

First, with reference to FIG. 3, a non-linear element group 1 formed with a single column is accommodated in a cylindrical grounding tank 3, at substantially the axially central portion thereof, in which an insulating medium 2 is enclosed. An umbrella-shaped shield 6 is disposed on the high potential side of the non-linear element group 1. Further, two spherical-crown shields 10*a* and 10*b* are disposed, symmetrically with respect to the central axis of the cylindrical grounding tank 3, on the low potential side of the shield 6 through connection support members 7*a* and 7*b*.

Figure 4:
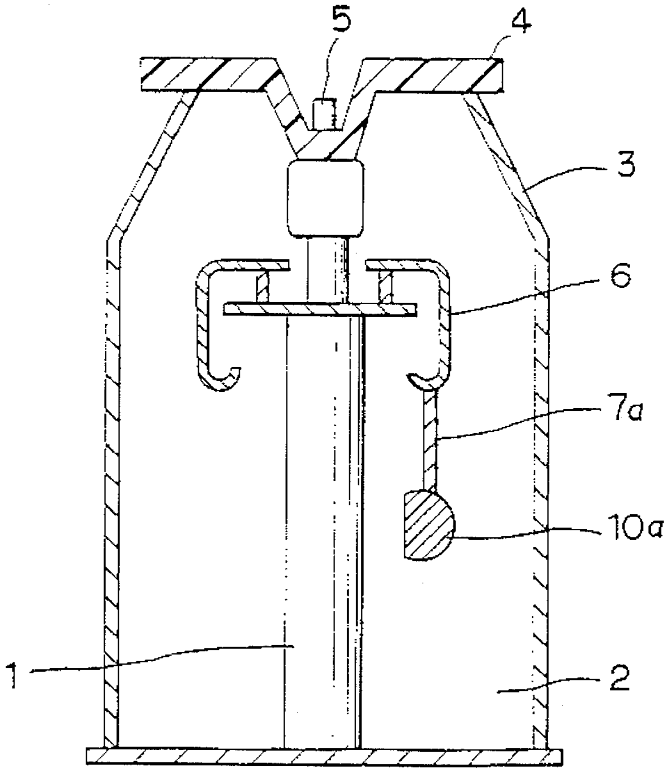
FIG. 4 is also a vertical sectional view of a tank-shape arrester according to a further embodiment of the present invention.

FIG. 4 represents a further embodiment of an arrester according to the present invention, which is formed similarly to the tank-shape arrester shown in FIG. 3 except that the spherical-crown shield(s) 10*a* are (is) disposed asymmetrically.

According to the embodiments of FIGS. 3 and 4, substantially the same or similar effects as those attained by the first embodiment can be achieved or attained.

The number and the size of the spherical-crown shields and the connection support members can be optionally determined as occasion demands. Although the foregoing embodiment comprises the spherical-crown shield having a solid cross sectional shape, it may have a hollow cross sectional shape or a C-shape cross sectional shape. In a case where the elliptical or spherical shape is adapted, it is preferred that a shape similar to a hemisphere is employed. The connection support member may be disposed to diagonally extend downward from the umbrella-shaped shield 6 and it is preferred that the connection support members are disposed symmetrically. Since a significantly limited influence upon the potential distribution is made as compared with the spherical-crown shield, a structure may be employed in which the conductor 5 on the high potential side shown in FIG. 1 project sideward from the grounding tank 3 for example. Since the influence upon the potential distribution can be prevented satisfactorily, the arrangement of the connection support members may be determined depending upon the results of analysis and actual measurement. The present invention is not limited to the tank-shape arrester in which a single or four parallel columns are connected in series. It may be widely applied to tank-shape arresters in each of which a plurality of parallel columns are connected in parallel.

As described above, according to the present invention, the connection of the spherical-crown shields to the low potential side of the umbrella-shaped shield through the connection support members enables the voltage assignment in the non-linear element group to be easily uniformed with a relatively simple structure. In addition, even if the non-linear element group is formed with a plurality of parallel columns, a tank-shape arrester capable of preventing imbalance in the divided flow among the columns can be provided.

What is claimed is:

1. An arrester in a shape of a tank, the arrester comprising:

a cylindrical grounding tank to be arranged vertically in which an insulating medium is enclosed;

a non-linear element group disposed inside the grounding tank, said non-linear element group being formed by vertically stacking a plurality of non-linear resisting elements in series at a substantially axially central portion of the grounding tank;

a shield having an umbrella-like shape disposed on a high potential side of the non-linear element group;

a ground potential portion connected to a low potential side thereof; and a shielding means operatively connected to a low potential side of the umbrella-shaped shield through a support means, said shielding means comprising at least one shielding member having a spherical shape provided with a spherical surface portion facing an inner side wall of the grounding tank and partially covering an outer peripheral surface of the non-linear element group.

2. An arrester according to claim 1, wherein said shielding means includes two shielding members disposed axially symmetrically with respect to the non-linear element group.

3. An arrester according to claim 1, wherein said non-linear element group comprises a single column of non-linear resisting element stack standing upwards along a central axis of the grounding tank.

4. An arrester according to claim 1, wherein said non-linear element group comprises a plurality of parallel columns arranged symmetrically with respect to a central axis of the grounding tank.

5. An arrester according to claim 1, wherein said shielding means has a solid structure.

6. An arrester according to claim 1, wherein said shielding means has a hollow structure.

7. An arrester according to claim 1, wherein said shielding means is formed of a plastic material which is plated with a metal.

8. An arrester according to claim 1, wherein said shielding means is formed of a light metal.

9. An arrester according to claim 1, wherein said shielding means is positioned at a vertical level of ½ to ⅓ length of the longitudinal length of said non-linear element group from a bottom thereof.

10. An arrester according to claim 1, wherein said shielding member has a flat portion facing the non-linear element group.

11. An arrester according to claim 10, wherein said shielding means has a hemispherical surface portion facing the inner side wall of the grounding tank and the flat portion facing the non-linear element group.

12. An arrester in a shape of a tank, the arrester comprising:

a cylindrical grounding tank to be arranged vertically in which an insulating medium is enclosed;

a non-linear element group disposed inside the grounding tank, said non-linear element group being formed by vertically stacking a plurality of non-linear resisting elements in series at a substantially axially central portion of the grounding tank;

a shield having an umbrella-like shape disposed on a high potential side of the non-linear element group;

a ground potential portion connected to a low potential side of the non-linear element group; and a shielding means operatively connected to a low potential side of the umbrella-shaped shield through a support means;

wherein said shielding means comprises at least one shielding member having a spherical shape provided with a first portion which faces an inner side wall of the grounding tank and a second portion which faces the low potential side of the non-linear element group so as to partially cover an outer peripheral surface of the low potential side of the non-linear element group, to thereby cause a discontinuous distribution of capacitance between the non-linear element group and the shielding means and between the non-linear element group and the cylindrical tank, such that a reduced capacitance is provided between the non-linear element group and the shielding means with respect to the low potential side of the non-linear element group to provide for a uniform potential distribution.

13. An arrester according to claim 12, further comprising two of said shielding members which are spaced from each other and symmetrically disposed around the non-linear element group.

* * * * *